(12) United States Patent
Kawanishi (10) Patent No.: US 11,137,280 B2
(45) Date of Patent: Oct. 5, 2021

(54) WEIGHING APPARATUS INCLUDING ROUGH-CHARGE WEIGHER AND COMBINATION WEIGHER

(71) Applicant: Shozo Kawanishi, Nishinomiya (JP)

(72) Inventor: Shozo Kawanishi, Nishinomiya (JP)

( * ) Notice: Subject to any disclaimer, the term of this patent is extended or adjusted under 35 U.S.C. 154(b) by 118 days.

(21) Appl. No.: 16/608,739

(22) PCT Filed: Apr. 27, 2018

(86) PCT No.: PCT/JP2018/017293
§ 371 (c)(1),
(2) Date: Oct. 25, 2019

(87) PCT Pub. No.: WO2018/199320
PCT Pub. Date: Nov. 1, 2018

(65) Prior Publication Data
US 2021/0063233 A1    Mar. 4, 2021

(30) Foreign Application Priority Data
Apr. 28, 2017  (JP) .............................. JP2017-089865

(51) Int. Cl.
*G01G 13/24*       (2006.01)
*G01G 19/393*      (2006.01)

(52) U.S. Cl.
CPC ........... *G01G 19/393* (2013.01); *G01G 13/24* (2013.01)

(58) Field of Classification Search
CPC ..... G01G 19/387; G01G 19/393; G01G 13/24
See application file for complete search history.

(56) References Cited

U.S. PATENT DOCUMENTS

| | | | | |
|---|---|---|---|---|
| 4,484,645 A | * | 11/1984 | Inoue ................... | G01G 19/393 177/114 |
| 4,535,428 A | * | 8/1985 | Furman .................... | G11C 8/16 365/189.07 |
| 4,615,403 A | * | 10/1986 | Nakamura ............. | G01G 11/12 177/121 |

(Continued)

FOREIGN PATENT DOCUMENTS

| EP | 0171295 A2 | 2/1986 |
|---|---|---|
| EP | 0171295 A3 | 10/1986 |

(Continued)

*Primary Examiner* — Randy W Gibson
(74) *Attorney, Agent, or Firm* — Alleman Hall Creasman & Tuttle LLP (57) ABSTRACT

A weighing apparatus includes a rough-charge weigher and a combination weigher. The rough-charge weigher includes: a feeding device; a lower hopper configured to hold and discharge objects to be weighed that are fed from the feeding device; a feeding adjuster configured to feed the objects to be weighed from the feeding device to the lower hopper, and adjust an amount of the objects to be weighed that are fed to the lower hopper; and a weight sensor provided on either the feeding device or the lower hopper. A controller: continuously measures, by the weight sensor, a weight of the objects to be weighed that are fed by the feeding adjuster from the feeding device to the lower hopper; and at a point when the weight of the objects to be weighed that are fed to the lower hopper has reached the rough-charge weight, stops the feeding adjuster.

6 Claims, 8 Drawing Sheets

(56) References Cited

U.S. PATENT DOCUMENTS

| | | | | | |
|---|---|---|---|---|---|
| 4,708,215 | A | * | 11/1987 | Nakamura | G01G 13/026 177/109 |
| 4,793,420 | A | * | 12/1988 | Hirano | G01G 13/248 177/50 |
| 5,423,455 | A | * | 6/1995 | Ricciardi | G01G 11/086 222/1 |
| 6,545,230 | B2 | * | 4/2003 | Tamai | G01G 19/393 177/121 |

FOREIGN PATENT DOCUMENTS

| | | |
|---|---|---|
| EP | 0736754 A1 | 10/1996 |
| JP | H08327439 A | 12/1996 |
| JP | 2003207384 A | 7/2003 |
| JP | 2014032181 A | 2/2014 |

* cited by examiner

WEIGHING APPARATUS INCLUDING ROUGH-CHARGE WEIGHER AND COMBINATION WEIGHER

TECHNICAL FIELD

The present invention relates to a weighing apparatus including a rough-charge weigher and a combination weigher.

BACKGROUND ART

Conventionally, there is a known weighing apparatus including a rough-charge weigher and a combination weigher. The rough-charge weigher weighs out objects to be weighed by a large-charge weighing hopper, such that the weighed objects have a weight less than a target weight by a predetermined weight, and discharges the weighed objects. The combination weigher weighs objects to be weighed by a plurality of small-charge weighing hoppers, performs combination calculation based on weights of the weighed objects that have been weighed by the plurality of small-charge weighing hoppers, thereby selecting the weighed objects in an optimal combination of small-charge weighing hoppers, and discharges the selected weighed objects (see Patent Literature 1, for example). According to this weighing apparatus, the difference between the target weight and the weight of the weighed objects that have been weighed out by the rough-charge weigher is used as a target combination weight. The combination weigher precisely weighs the objects to be weighed, and discharges the precisely weighed objects. In a collection chute, the weighed objects discharged from the combination weigher and the weighed objects discharged from the rough-charge weigher are gathered together. In this manner, favorable quantitative precision is achieved even if the target weight is great.

CITATION LIST

Patent Literature

PTL 1: Japanese Laid-Open Patent Application Publication No. 2003-207384

SUMMARY OF INVENTION

Technical Problem

However, in the rough-charge weigher, the objects to be weighed are charged into the large-charge weighing hopper (i.e., volume charging) by opening a cut gate for a predetermined time. In this case, the weight of the objects to be weighed that are charged into the large-charge weighing hopper varies. For this reason, even if the weighing precision at the large-charge weighing hopper is high, the weight of the weighed objects discharged from the large-charge weighing hopper varies. Meanwhile, in the combination weigher, which adopts combination calculation essentially intended for fixed weighing, the difference between the target weight and the weight of the weighed objects discharged from the rough-charge weigher is set as the target combination weight. Here, if the aforementioned variation in weight at the rough-charge weigher is excessive, the combination weigher cannot fully exert its performance, causing reduction in the quantitative precision of the overall weighing apparatus.

In view of the above, an object of the present invention is to prevent reduction in the quantitative precision of a heavy-weight weighing apparatus that includes a rough-charge weigher and a combination weigher.

Solution to Problem

A weighing apparatus according to one aspect of the present invention includes: a rough-charge weigher configured to weigh out objects to be weighed, such that the weighed objects have a predetermined rough-charge weight less than a target weight, and discharge the weighed objects; a combination weigher including a plurality of weighing hoppers, each of which is configured to be fed with objects to be weighed, the combination weigher being configured to use a difference between the weight of the weighed objects that have been weighed out by the rough-charge weigher and the target weight as a target combination weight, weigh the fed objects to be weighed by the plurality of weighing hoppers, select a combination of weighing hoppers, from which to discharge the weighed objects, from among the plurality of weighing hoppers based on weights of the weighed objects that have been weighed by the plurality of weighing hoppers and the target combination weight, and discharge the weighed objects from the selected combination of weighing hoppers; a collecting chute configured to collect the weighed objects discharged from the rough-charge weigher and the weighed objects discharged from the combination weigher, and discharge the collected weighed objects; and a controller configured to control the rough-charge weigher and the combination weigher. The rough-charge weigher includes: a feeding device configured to hold and discharge the objects to be weighed; a lower hopper configured to hold and discharge the objects to be weighed that are fed from the feeding device; a feeding adjuster configured to feed the objects to be weighed from the feeding device to the lower hopper, and adjust an amount of the objects to be weighed that are fed from the feeding device to the lower hopper; and a weight sensor provided on either the feeding device or the lower hopper. The controller: continuously measures, by the weight sensor, a weight of the objects to be weighed that are fed by the feeding adjuster from the feeding device to the lower hopper; and at a point when the weight of the objects to be weighed that are fed to the lower hopper has reached the rough-charge weight, stops the feeding adjuster from feeding the objects to be weighed.

According to the above configuration, the objects to be weighed are weighed in the rough-charge weigher not after the objects to be weighed are volume-charged into the lower hopper, but the objects to be weighed are weighed during being charged into the lower hopper, i.e., weighed by charge weighing. Therefore, variation in the weight of the weighed objects discharged from the rough-charge weigher to the collecting chute is suppressed. As a result, when the weighed objects discharged from the rough-charge weigher and the weighed objects discharged from the combination weigher are collected together, the total weight of the weighed objects thus collected is very close to the target weight. This makes it possible to prevent reduction in the quantitative precision of the weighing apparatus even if the target weight is great.

The feeding device may be an upper hopper configured to hold and discharge the objects to be weighed.

The rough-charge weigher may include a plurality of rough-charge weighing units, each of which includes the feeding device, the feeding adjuster, the lower hopper, and the weight sensor. The controller may: cause weighing cycles of the plurality of respective rough-charge weighing units to overlap each other; and cause each of the plurality of rough-charge weighing units to discharge the weighed objects after weighing thereby has been completed, such that the plurality of rough-charge weighing units start discharging the weighed objects sequentially in an order of completion of the weighing thereby.

According to the above configuration, time intervals between the timings of discharging the weighed objects from the rough-charge weigher are shortened. This allows the combination weigher, which combines the weighed objects that have been weighed within a very short time by volume charging and then discharges the combined weighed objects, to sufficiently exert its fast-operation characteristics. As a result, the weighing speed of the overall weighing apparatus increases.

The controller may set a period from when feeding of the objects to be weighed from the feeding device to the lower hopper ends until when discharging of the weighed objects from the lower hopper starts to be shorter than either a period of the feeding of the objects to be weighed from the feeding device to the lower hopper or a period of the discharging of the weighed objects from the lower hopper.

According to the above configuration, charging of the objects to be weighed from the feeding device into the lower hopper is performed not by volume charging, but by charge weighing. This makes it possible to shorten the period from when the feeding of the objects to be weighed from the feeding device to the lower hopper ends until when the discharging of the weighed objects from the lower hopper starts. Consequently, the weighing speed can be increased.

The weight sensor may be provided on the feeding device. The controller may set a period from when discharging of the weighed objects from the lower hopper ends until when feeding of the objects to be weighed from the feeding device to the lower hopper starts to be shorter than a period of the feeding of the objects to be weighed from the feeding device to the lower hopper.

According to the above configuration, the weight sensor is provided not on the lower hopper, but on the feeding device. For this reason, vibration caused by the discharging from the lower hopper is less likely to be transmitted to the weight sensor, and also, at a point when the discharging from the lower hopper ends, a certain time has elapsed since the end of the discharging from the feeding device. Therefore, the period from when the discharging of the weighed objects from the lower hopper ends until when the feeding of the objects to be weighed from the feeding device to the lower hopper starts can be shortened, and thereby the weighing speed can be increased.

Advantageous Effects of Invention

The present invention makes it possible to prevent reduction in the quantitative precision of a heavy-weight weighing apparatus that includes a rough-charge weigher and a combination weigher.

DESCRIPTION OF EMBODIMENTS

Hereinafter, embodiments are described with reference to the drawings.

Embodiment 1

Figure 1:
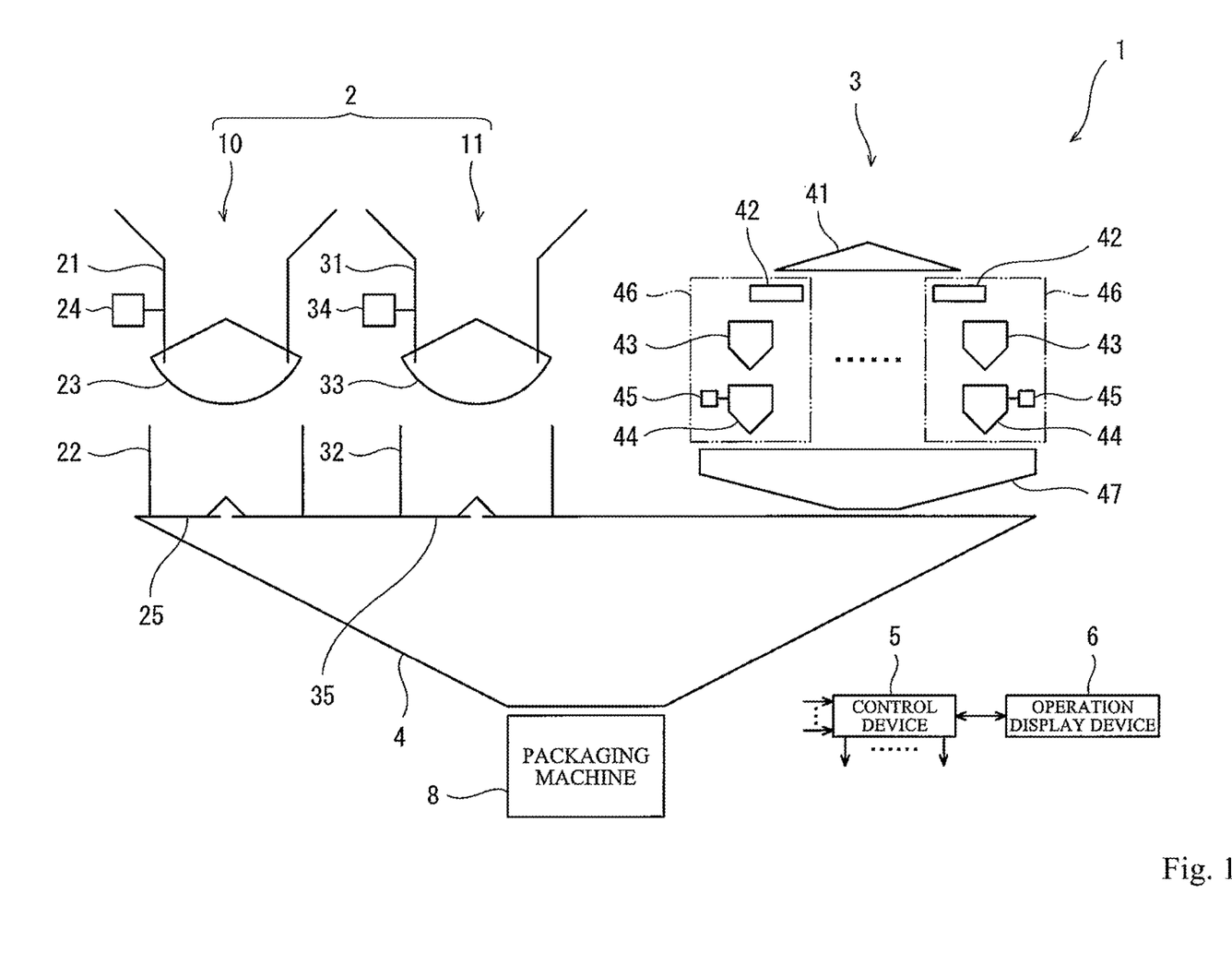
FIG. 1 is a schematic diagram of a weighing apparatus according to Embodiment 1.

FIG. 1 is a schematic diagram of a weighing apparatus 1 according to Embodiment 1. As shown in FIG. 1, the weighing apparatus 1 is a heavy-weight weighing apparatus including: a rough-charge weigher 2; a combination weigher 3; a collecting chute 4 configured to collect weighed objects discharged from the rough-charge weigher 2 and weighed objects discharged from the combination weigher 3, and discharge the collected weighed objects; a control device 5 configured to control the rough-charge weigher 2 and the combination weigher 3; and an operation display device 6, by which operations can be inputted to the control device 5 and which is also capable of displaying outputs from the control device 5.

The rough-charge weigher 2 weighs out objects to be weighed, such that the weighed objects have a predetermined rough-charge weight less than a target weight, and discharges the weighed objects. The rough-charge weigher 2 includes, for example, a plurality of rough-charge weighing units 10 and 11. The present embodiment illustratively shows a first rough-charge weighing unit 10 and a second rough-charge weighing unit 11. Each of the first rough-charge weighing unit 10 and the second rough-charge weighing unit 11 weighs out the objects to be weighed, such that the weighed objects have a weight in a predetermined proportion to the target weight to be discharged from the collecting chute 4 (for example, the predetermined proportion is set within the range of 85 to 95% (e.g., 90%)) (hereinafter, the weight in the predetermined proportion to the target weight is referred to as "the rough-charge weight"), and discharges the weighed objects having the rough-charge weight to the collecting chute 4.

The first rough-charge weighing unit 10 includes: a first upper hopper 21 (feeding device), a first lower hopper 22, a first cut gate 23, a first weight sensor 24, and a first discharge gate 25. The first upper hopper 21 holds the objects to be weighed, and then discharges them downward. The first lower hopper 22 is disposed below the first upper hopper 21. The first lower hopper 22 holds the objects to be weighed that are fed from the first upper hopper 21, and then discharges them to the collecting chute 4. The first cut gate 23 is provided on the first upper hopper 21, and opens/closes a feed passage from the first upper hopper 21 to the first lower hopper 22.

The first weight sensor 24 is a load cell. The first weight sensor 24 weighs the objects to be weighed that are held in the first upper hopper 21. Specifically, the first weight sensor 24 measures the weight of the objects, and when a reduction occurs in the measured weight, the reduction in the weight is measured as the weight of the objects that have been charged from the first upper hopper 21 into the first lower hopper 22. The first discharge gate 25 is provided on the first lower hopper 22, and opens/closes a discharge passage from the first lower hopper 22 to the collecting chute 4. It should be noted that the second rough-charge weighing unit 11 is configured in the same manner as the first rough-charge weighing unit 10. The second rough-charge weighing unit 11 includes a second upper hopper 31 (feeding device), a second lower hopper 32, a second cut gate 33, a second weight sensor 34, and a second discharge gate 35.

A dispersion feeder 41 including a vibrator is provided at the center of the top part of the combination weigher 3. By utilizing vibration generated by the vibrator, the dispersion feeder 41 radially disperses the objects to be weighed that are fed from the outside. A plurality of linear feeders 42, each of which includes a vibrator, are radially arranged around the dispersion feeder 41. The linear feeders 42, by utilizing vibration, convey the objects to be weighed that are fed from the dispersion feeder 41, and feed out the objects to be weighed to feeding hoppers 43, which are provided at the object feed-out side of the linear feeders 42, respectively.

Each of the feeding hoppers 43 holds the objects to be weighed that are fed from a corresponding one of the linear feeders 42, and discharges them downward. Weighing hoppers 44 are provided below the feeding hoppers 43, respectively. Each weighing hopper 44 is provided with a weight sensor 45, which is a load cell. Each weighing hopper 44 weighs the objects to be weighed that are held therein by means of the weight sensor 45. The combination weigher 3 includes a plurality of (e.g., 4 to 20) weighing units 46, each of which is constituted by the linear feeder 42, the feeding hopper 43, the weighing hopper 44, and the weight sensor 45. A capturing chute 47 is provided below the plurality of weighing hoppers 44. The capturing chute 47 collects the weighed objects discharged from the weighing hoppers 44, and discharges the collected weighed objects from a bottom discharge port. The weighed objects discharged from the rough-charge weigher 2 and the weighed objects discharged from the combination weigher 3 are gathered together in the collecting chute 4, and then discharged from a discharge port of the collecting chute 4 to the packaging machine 8.

Figure 2:
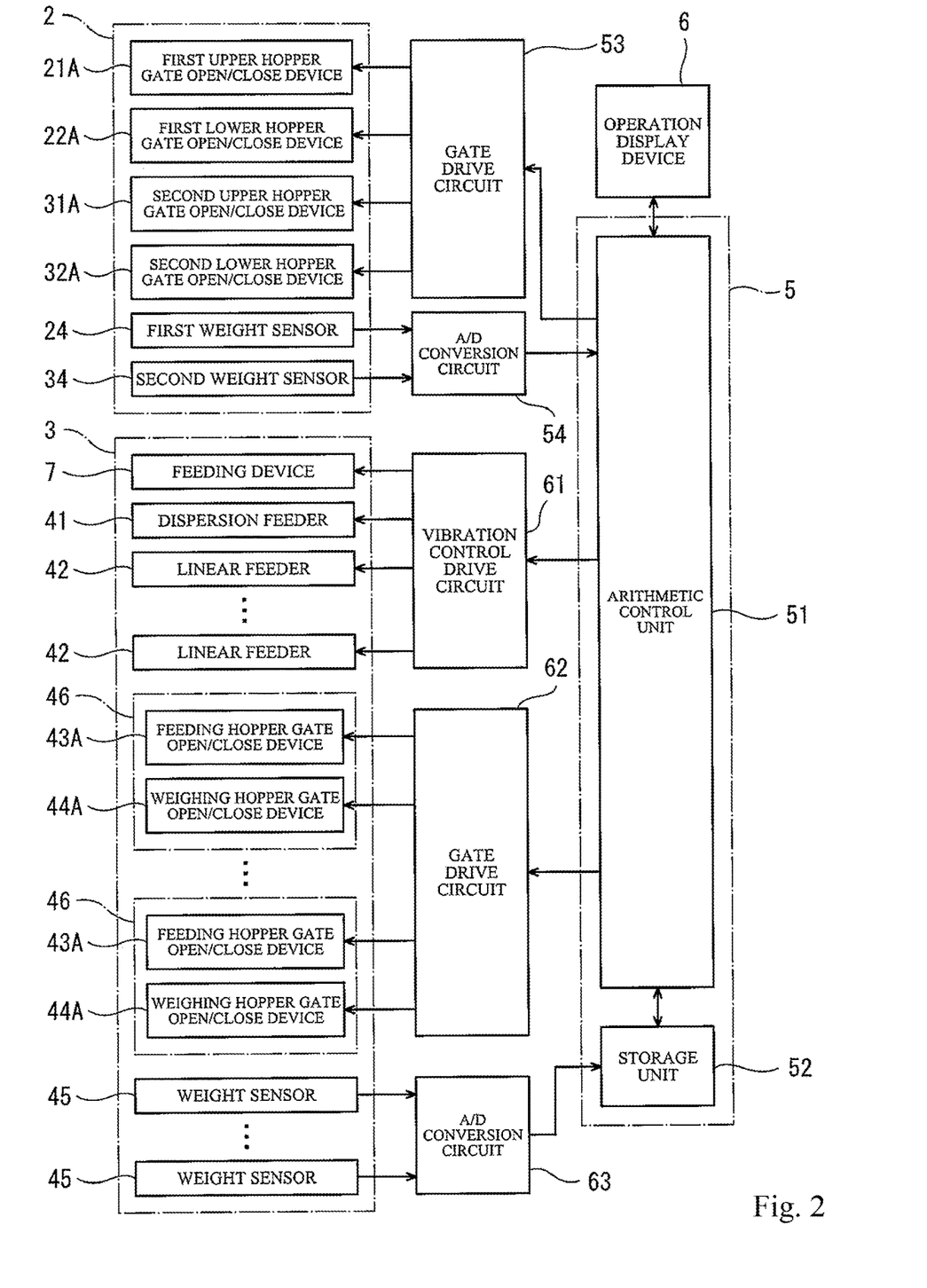
FIG. 2 is a block diagram of a control system of the weighing apparatus shown in FIG. 1.

FIG. 2 is a block diagram of a control system of the weighing apparatus 1 shown in FIG. 1. As shown in FIG. 2, the control device 5 includes: an arithmetic control unit 51 including, for example, a CPU; and a storage unit 52 including memories such as a RAM and a ROM. The storage unit 52 stores therein, for example, a running program, running setting data containing a large number of running parameters, and weighing value data. The arithmetic control unit 51 executes the running program stored in the storage unit 52 to, for example, control the rough-charge weigher 2, the combination weigher 3, and the feeding devices 7.

In relation to the control of the rough-charge weigher 2, the arithmetic control unit 51 controls, via a gate drive circuit 53, operations of actuators (e.g., servomotors) of gate open/close devices 21A and 31A configured to open/close the first and second cut gates 23 and 33 of the first and second upper hoppers 21 and 31, and operations of actuators (e.g., pulse motors) of gate open/close devices 22A and 32A configured to open/close the gates of the first and second lower hoppers 22 and 32. The arithmetic control unit 51 receives weighing values from the first and second weight sensors 24 and 34 of the rough-charge weigher 2 via an A/D conversion circuit 54.

In relation to the control of the combination weigher 3, the arithmetic control unit 51 controls the operation of the vibrator of the dispersion feeder 41 and the operation of each of the vibrators of the linear feeders 42 via a vibration control drive circuit 61. The arithmetic control unit 51 controls, via a gate drive circuit 62, operations of actuators (e.g., pulse motors) of gate open/close devices 43A and 44A configured to open/close gates of the feeding hoppers 43 and the weighing hoppers 44. The arithmetic control unit 51 receives weighing values from the weight sensors 45 of the combination weigher 3 via an A/D conversion circuit 63. The arithmetic control unit 51 receives input signals from the operation display device 6, and outputs signals to the operation display device 6, such as data to be displayed thereon.

The arithmetic control unit 51 performs combination calculation, in which: the difference between the target weight and the weight of the weighed objects that have been weighed out by the first rough-charge weighing unit 10 or the second rough-charge weighing unit 11 is used as a target combination weight; and based on weights of the weighed objects that have been weighed by the plurality of weighing hoppers 44 and the target combination weight, a combination of weighing hoppers 44, from which to discharge the weighed objects, is selected from among the plurality of weighing hoppers 44. Then, the gate open/close device 44A of each of the selected weighing hoppers 44 is driven to discharge the weighed objects therefrom.

The operation display device 6 has: input functions for, for example, operating the weighing apparatus 1 and setting the running parameters; and display functions for displaying, for example, the running status of the weighing apparatus 1. The operation display device 6 includes, for example, a touch screen display, and a user performs operations on the screen, such as starting and stopping the running of the weighing apparatus 1. Also, by switching the display screen of the operation display device 6, the user can perform, for example, the setting of the running parameters of the weighing apparatus 1. While the weighing apparatus 1 is running, the operation display device 6 displays, for example, the running status of the weighing apparatus 1, such as the running speed and combination calculation results.

Figure 3:
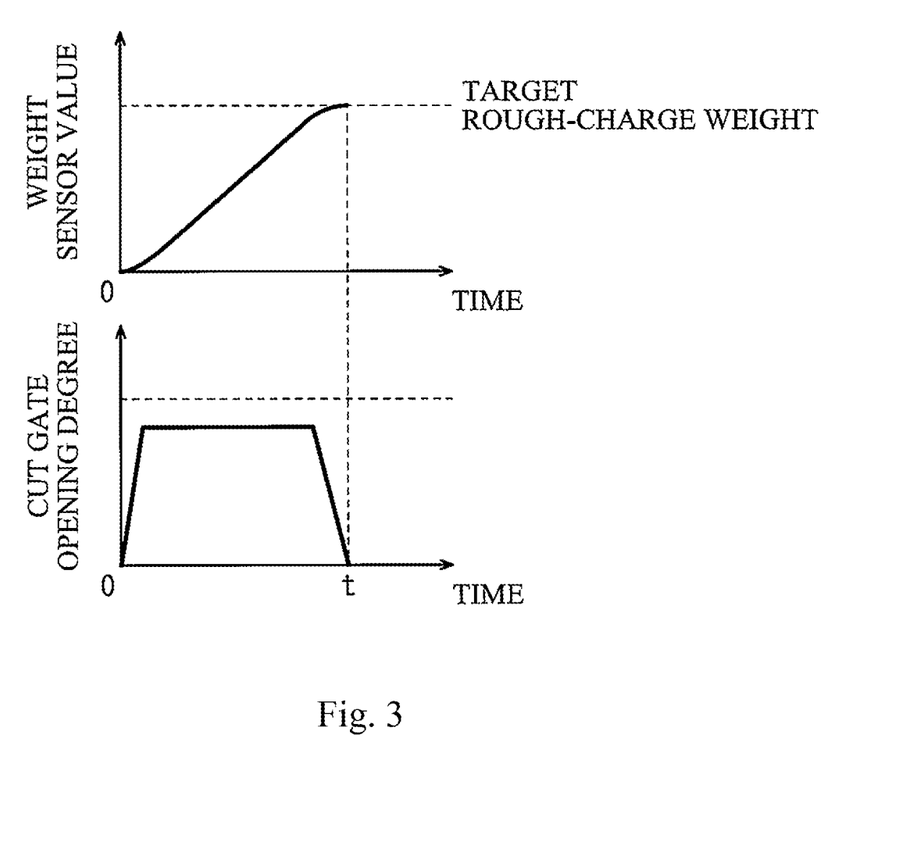
FIG. 3 is a graph showing a relationship between a weight sensor value and the degree of opening of a cut gate of a rough-charge weigher of the weighing apparatus shown in FIG. 1

FIG. 3 is a graph showing a relationship between a detection value of the weight sensor 45 and the degree of opening of the cut gate 23 or 33 of the rough-charge weigher 2 of the weighing apparatus 1 shown in FIG. 1. It should be noted that the control of the first rough-charge weighing unit 10 and the control of the second rough-charge weighing unit 11 are the same, except that the weighing cycle of the first rough-charge weighing unit 10 and the weighing cycle of the second rough-charge weighing unit 11 are shifted in time from each other. For this reason, hereinafter, the control of the first rough-charge weighing unit 10 is described as a representative example. As shown in FIG. 3, the control device 5 continuously measures, by the first weight sensor 24, the weight of objects to be weighed that are fed from the first upper hopper 21 to the first lower hopper 22 while the first cut gate 23 is open. When the measured weight has reached a weight in a predetermined proportion to the target rough-charge weight (for example, the predetermined proportion is set within the range of 85 to 95% (e.g., 90%)), the control device 5 starts gradually decreasing the degree of opening of the first cut gate 23. Then, at a point when the weight of the objects to be weighed that have been fed to the first lower hopper 22, the weight being measured by the first weight sensor 24, has reached the target rough-charge weight (i.e., time t), the control device 5 closes the first cut gate 23. That is, the objects to be weighed that have been charged from the first upper hopper 21 into the first lower hopper 22 are weighed not by volume weighing in which the objects to be weighed are weighed after being volume-charged, but by charge weighing in which the objects to be weighed are weighed during being charged.

Figure 4:
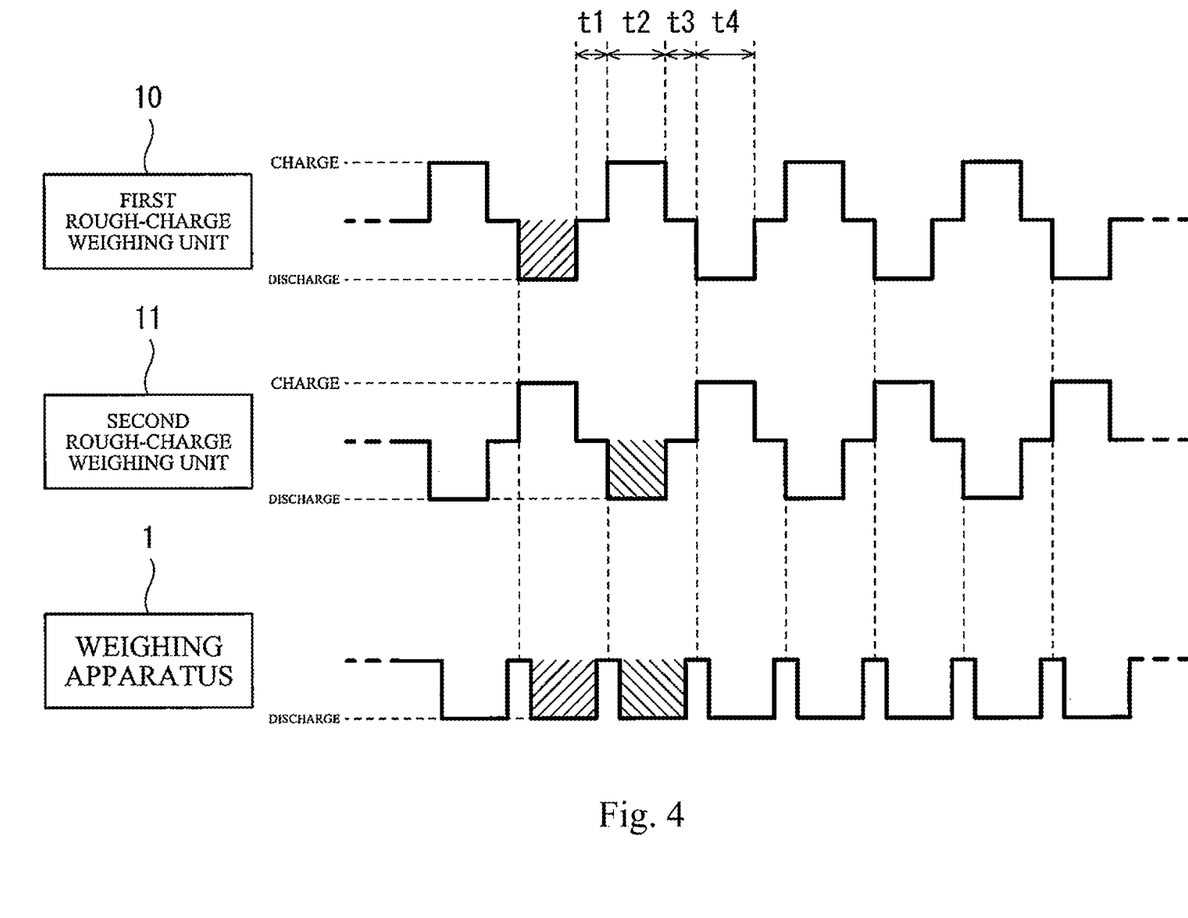
FIG. 4 is a control timing chart of the weighing apparatus shown in FIG. 1.

FIG. 4 is a control timing chart of the weighing apparatus 1 shown in FIG. 1. It should be noted that the weighing cycle of the combination weigher 3 is shorter in time than the weighing cycle of each of the first and second rough-charge weighing units 10 and 11. For this reason, the weighing cycle of the combination weigher 3 is omitted in FIG. 4. Also, in FIG. 4, "CHARGE" means charging into the lower hopper 22 or 32, "DISCHARGE" of the first and second rough-charge weighing units 10 and 11 means discharging from the lower hoppers 22 and 32, and "DISCHARGE" of the weighing apparatus 1 means discharging from the collecting chute 4.

As shown in FIG. 4, the control device 5 causes the weighing cycle of the first rough-charge weighing unit 10 and the weighing cycle of the second rough-charge weighing unit 11 to overlap each other, and causes the first and second rough-charge weighing units 10 and 11 to discharge the weighed objects sequentially after the weighing thereby has been completed, such that whichever of the first and second rough-charge weighing units 10 and 11 completes the weighing first, the rough-charge weighing unit that has completed the weighing first starts discharging the weighed objects first. The control performed in the weighing cycle of the first rough-charge weighing unit 10 and the control performed in the weighing cycle of the second rough-charge weighing unit 11 are the same, except that the start point of the weighing cycle of the first rough-charge weighing unit 10 and the start point of the weighing cycle of the second rough-charge weighing unit 11 are shifted in time from each other. For this reason, hereinafter, the control performed in the weighing cycle of the first rough-charge weighing unit 10 is described as a representative example.

The weighing cycle of the first rough-charge weighing unit 10 is constituted by "zero point correction", "charging", "adjustment, and "discharging". A period (t1) for the "zero point correction" is a period after the first cut gate 23 is returned from an open state to a closed state, and in this period, a charged weight into the first lower hopper 22, the charged weight being measured by the first weight sensor 24, is reset to zero. A period (t2) for the "charging" is a period in which the objects to be weighed are charged from the first upper hopper 21 into the first lower hopper 22. A period (t3) for the "adjustment" is a period for adjusting the discharge timing of the first lower hopper 22. A period (t4) for the "discharging" is a period in which the weighed objects are discharged from the first lower hopper 22 to the collecting chute 4.

In the present embodiment, the first weight sensor 24 is provided not on the first lower hopper 22, but on the first upper hopper 21. For this reason, vibration caused by the discharging from the first lower hopper 22 is less likely to be transmitted to the first weight sensor 24, and also, at a point when the discharging from the first lower hopper 22 ends, a certain time has elapsed since the closing of the first cut gate 23 of the first upper hopper 21. Therefore, the period from when the "discharging" from the first lower hopper 22 ends until when the "charging" into the first lower hopper 22 starts can be made shorter than the period of the "charging" into the first lower hopper 22 (t1<t2). In addition, the objects to be weighed that have been charged from the first upper hopper 21 into the first lower hopper 22 are weighed not by volume weighing, but by charge weighing. Therefore, the period from when the "charging" into the first lower hopper 22 ends until when the "discharging" from the first lower hopper 22 starts can be made shorter than each of the period of the "charging" into the first lower hopper 22 and the period of the "discharging" from the first lower hopper 22 (t3<t2 and t3<t4). The discharge timing of the rough-charge weighing unit 10 and the discharge timing of the rough-charge weighing unit 11 are set relative to each other, such that time intervals between discharge timings of the overall rough-charge weigher 2 are equal time intervals.

According to the above-described configuration, the objects to be weighed that are fed to the first and second lower hoppers 22 and 32 of the rough-charge weigher 2 are weighed not by volume weighing, but by charge weighing. Therefore, variation in the weight of the weighed objects discharged from the rough-charge weigher 2 to the collecting chute 4 is suppressed. As a result, when the weighed objects discharged from the rough-charge weigher 2 and the weighed objects discharged from the combination weigher 3 are collected together, the total weight of the weighed objects thus collected is very close to the target weight. This makes it possible to prevent reduction in the quantitative precision of the weighing apparatus 1 even if the target weight is great.

Further, the control device 5 causes the weighing cycle of the first rough-charge weighing unit 10 and the weighing cycle of the second rough-charge weighing unit 11 to overlap each other, and causes the first and second rough-charge weighing units 10 and 11 to discharge the weighed objects sequentially after the weighing thereby has been completed, such that whichever of the first and second rough-charge weighing units 10 and 11 completes the weighing first, the rough-charge weighing unit that has completed the weighing first starts discharging the weighed objects first. As a result, time intervals between the timings of discharging the weighed objects from the rough-charge weigher 2 are shortened. This allows the combination weigher 3, which combines the weighed objects that have been weighed within a very short time by volume charging and then discharges the combined weighed objects, to sufficiently exert its fast-operation characteristics. As a result, the weighing speed of the weighing apparatus 1 increases. In particular, in the rough-charge weigher 2 of the present embodiment, the first and second weight sensors 24 and 34 are provided on the first and second upper hoppers 21 and 31, respectively, and the objects to be weighed that are fed to the first and second lower hoppers 22 and 32 are weighed by charge weighing. Therefore, the weighing cycle of the first rough-charge weighing unit 10 and the weighing cycle of the second rough-charge weighing unit 11 can be readily brought close to each other chronologically so as to overlap each other, which makes it possible to favorably shorten time intervals between the discharge timings of the weighing apparatus 1.

Embodiment 2

Figure 5:
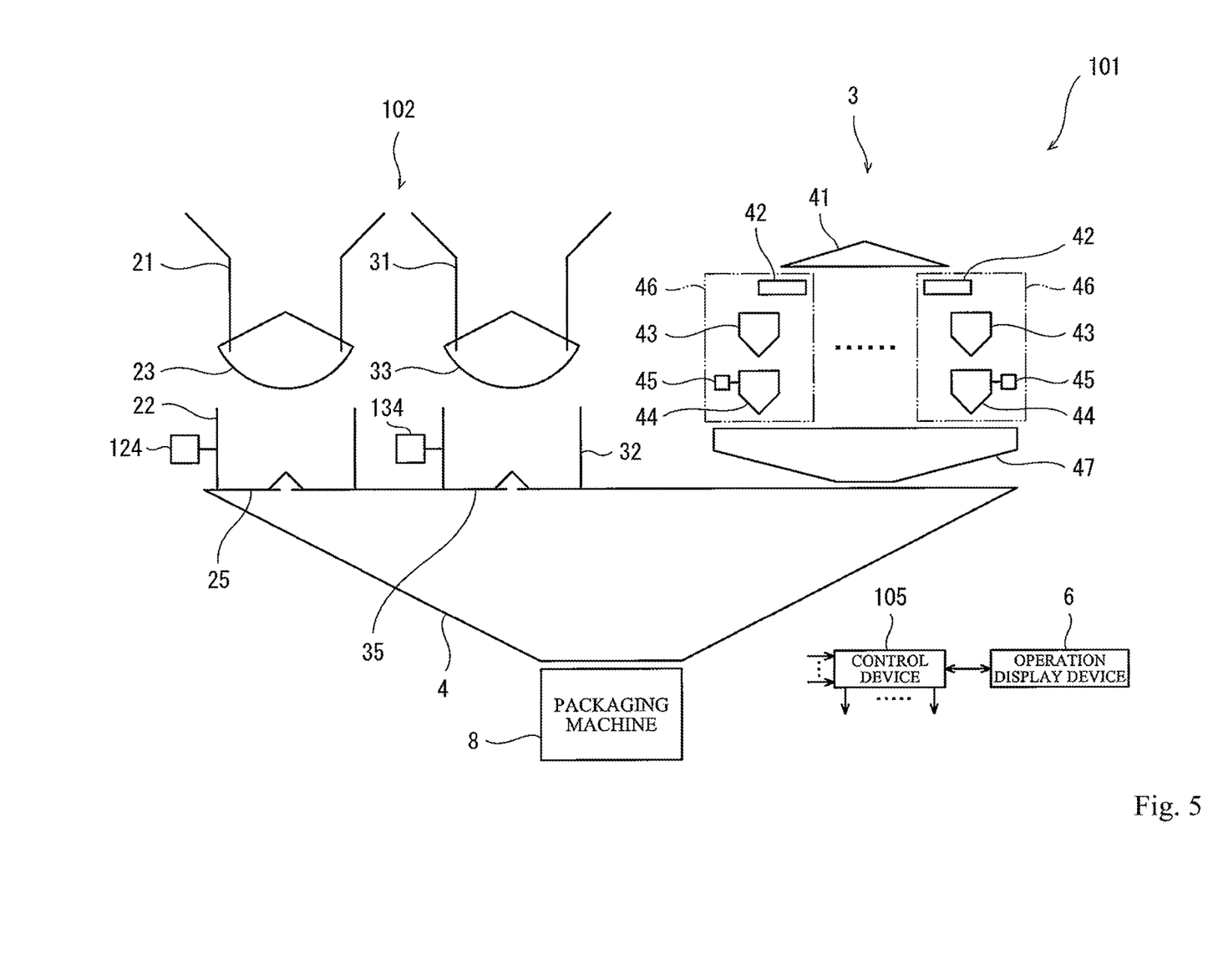
FIG. 5 is a schematic diagram of a weighing apparatus according to Embodiment 2.

FIG. 5 is a schematic diagram of a weighing apparatus 101 according to Embodiment 2. It should be noted that, in the present embodiment, the same components as those described in Embodiment 1 are denoted by the same reference signs as those used in Embodiment 1, and the description of such common components is omitted. As shown in FIG. 5, in the weighing apparatus 101 of Embodiment 2, first and second weight sensors 124 and 134 of a rough-charge weigher 102 are provided on the first and second lower hoppers 22 and 32, respectively. Also in the rough-charge weigher 102, the objects to be weighed that are charged from the first upper hopper 21 into the first lower hopper 22 are weighed not by volume weighing, but by charge weighing. A control device 105 of the weighing apparatus 101 controls the first and second cut gates 23 and 33 in a manner similar to the case illustrated in FIG. 3. That is, the first cut gate 23 is opened and the objects to be weighed are charged into the first lower hopper 22 at a constant flow rate stably, and at a point when the weight of the charged objects, the weight being measured by the first weight sensor 124, has reached the target rough-charge weight, the first cut gate 23 is closed to stop charging the objects to be weighed.

In conventional art, at the moment when the first cut gate 23 is closed, the objects to be weighed are present in the air between the upper hopper 21 and the lower hopper 22. For this reason, the weight of the objects to be weighed that would be present in the air at the point when the first cut gate 23 is closed is estimated, and the first cut gate 23 is closed early by taking the estimated weight into account. However, the present embodiment pays attention to a phenomenon in which an impact load that is applied to the lower hopper 22 by the objects to be weighed that continuously fall from the upper hopper 21 into the lower hopper 22 is equivalent to the weight of the objects to be weighed that are present in the air at the point when the first cut gate 23 is closed. Accordingly, in the present embodiment, the first cut gate 23 is closed at the moment when the weight of the objects to be weighed, the weight being detected by the first weight sensor 124, has reached the target rough-charge weight.

The configuration thus described also makes it possible to favorably prevent reduction in the quantitative precision of the heavy-weight weighing apparatus 101, which includes the rough-charge weigher 102 and the combination weigher 3. Since the other configurational features are the same as those described above in Embodiment 1, the description thereof is omitted.

Embodiment 3

Figure 6:
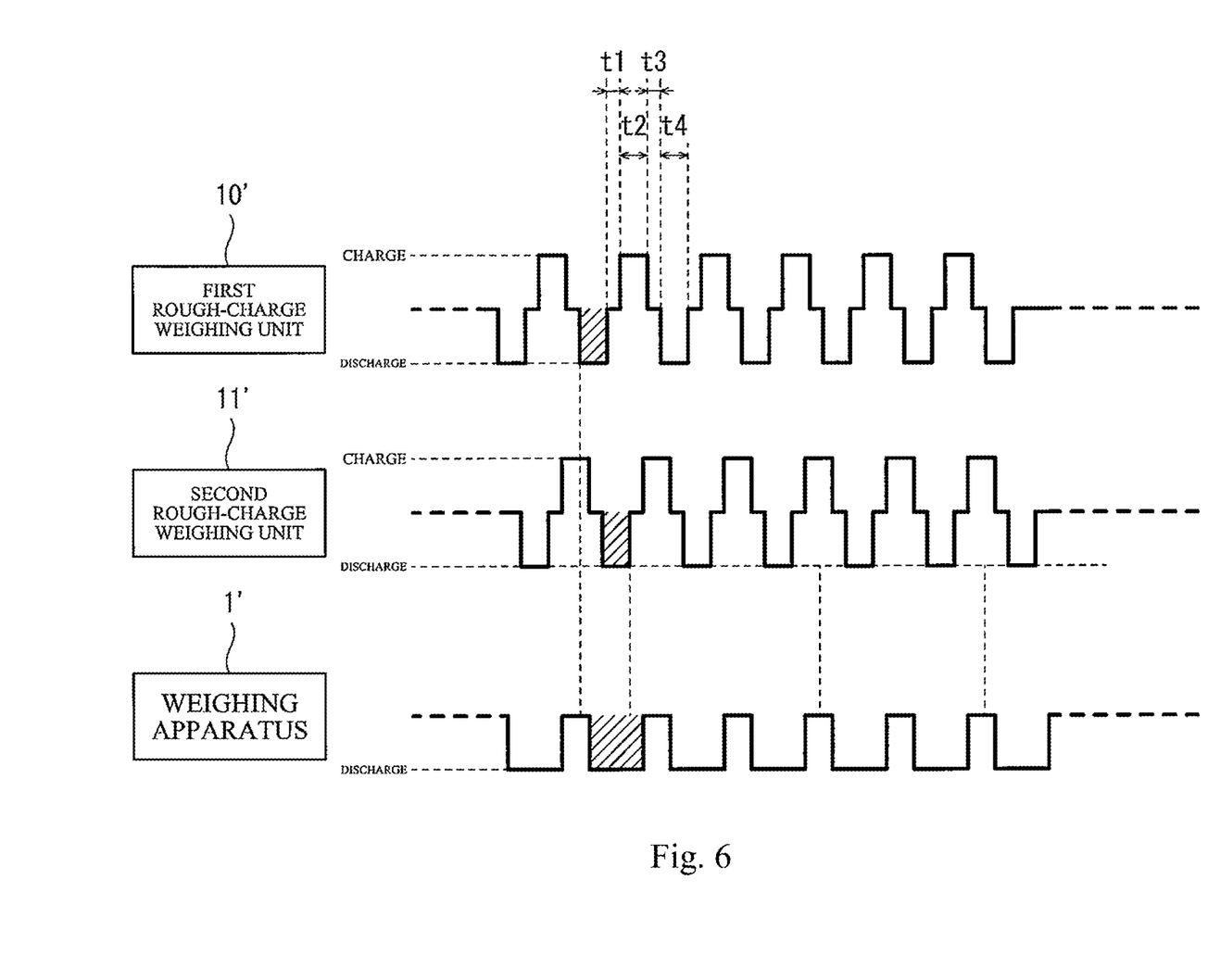
FIG. 6 is a control timing chart of a weighing apparatus according to Embodiment 3, corresponding to FIG. 4.

FIG. 6 is a control timing chart of a weighing apparatus 1' according to Embodiment 3, corresponding to FIG. 4. As shown in FIG. 6, in the weighing apparatus 1' of Embodiment 3, a plurality of rough-charge weighing units 10' and 11' perform discharging corresponding to the combination weigher 3 performing discharging once. That is, for packaging by the packaging machine 8 once, the combination weigher 3 performs discharging once, and also the plurality of rough-charge weighing units 10' and 11' perform discharging. The weighing cycle of the first rough-charge weighing unit 10' and the weighing cycle of the second rough-charge weighing unit 11' overlap each other, and the first and second rough-charge weighing units 10' and 11' are caused to discharge the weighed objects sequentially after the weighing thereby has been completed, such that whichever of the first and second rough-charge weighing units 10' and 11' completes the weighing first, the rough-charge weighing unit that has completed the weighing first starts discharging the weighed objects first. The amount of objects to be weighed that are charged into the first and second rough-charge weighing units 10' and 11' in Embodiment 3 is less than the amount of objects to be weighed that are charged into the first and second rough-charge weighing units 10 and 11 in Embodiment 1, and also, the amount of weighed objects discharged from the first and second rough-charge weighing units 10' and 11' in Embodiment 3 is less than the amount of weighed objects discharged from the first and second rough-charge weighing units 10 and 11 in Embodiment 1. The weighed objects discharged from the first rough-charge weighing unit 10', the weighed objects discharged from the second rough-charge weighing unit 11', and the weighed objects discharged from the combination weigher 3 are gathered together in the collecting chute 4, and then discharged from the discharge port of the collecting chute 4 to the packaging machine 8.

According to the above-described configuration, the rough-charge weighing units 10' and 11' can be reduced in size even if the target weight of the weighing apparatus 1' is great. It should be noted that, instead of causing the weighing cycles of the first and second rough-charge weighing units 10' and 11' to overlap each other, the timings of the weighing cycles may be caused to coincide with each other. One rough-charge weighing unit 10' may perform discharging twice corresponding to the combination weigher 3 performing discharging once. The number of rough-charge weighing units may be three or more. Since the other configurational features are the same as those described above in Embodiment 1, the description thereof is omitted.

Embodiment 4

Figure 7:
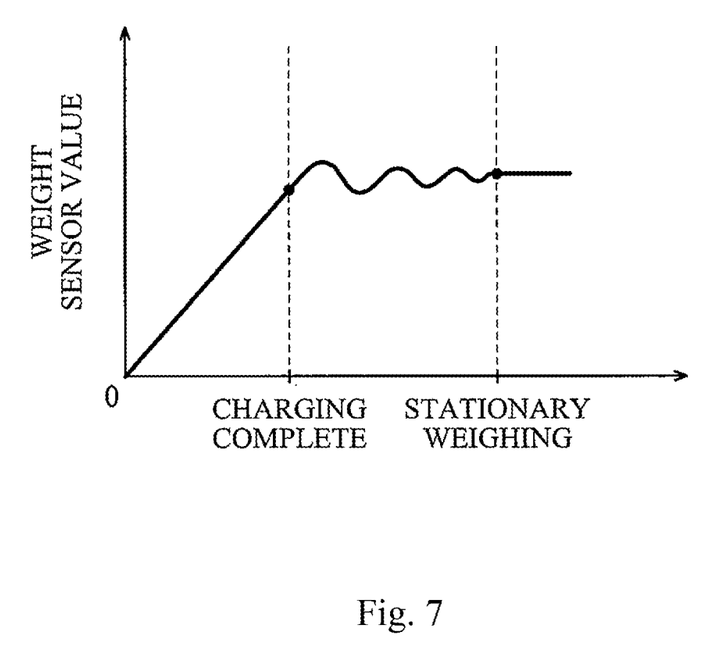
FIG. 7 is a graph showing a relationship between a weight sensor value and a weighing timing of the rough-charge weigher of a weighing apparatus according to Embodiment 4.

FIG. 7 is a graph showing a relationship between a weight sensor value and a weighing timing of the rough-charge weigher 3 of a weighing apparatus according to Embodiment 4. As shown in FIG. 7, Embodiment 4 is different from Embodiment 2 in that the weighing apparatus of Embodiment 4 performs stationary weighing after the charge weighing. In the present embodiment, in the rough-charge weigher 3, after the charge weighing is completed by closing the cut gates 23 and 33, when a predetermined time has elapsed and before the lower hoppers 22 and 32 perform discharging, the weight sensors 124 and 134 perform weighing additionally. Specifically, after the charge weighing is completed, when the detection values of the weight sensors 124 and 134 have stopped varying, the weight sensors 124 and 134 additionally perform high-precision weighing (stationary weighing). This makes it possible to realize both reduction in weight variation and improvement in weighing precision in the rough-charge weigher 3.

Embodiment 5

Figure 8:
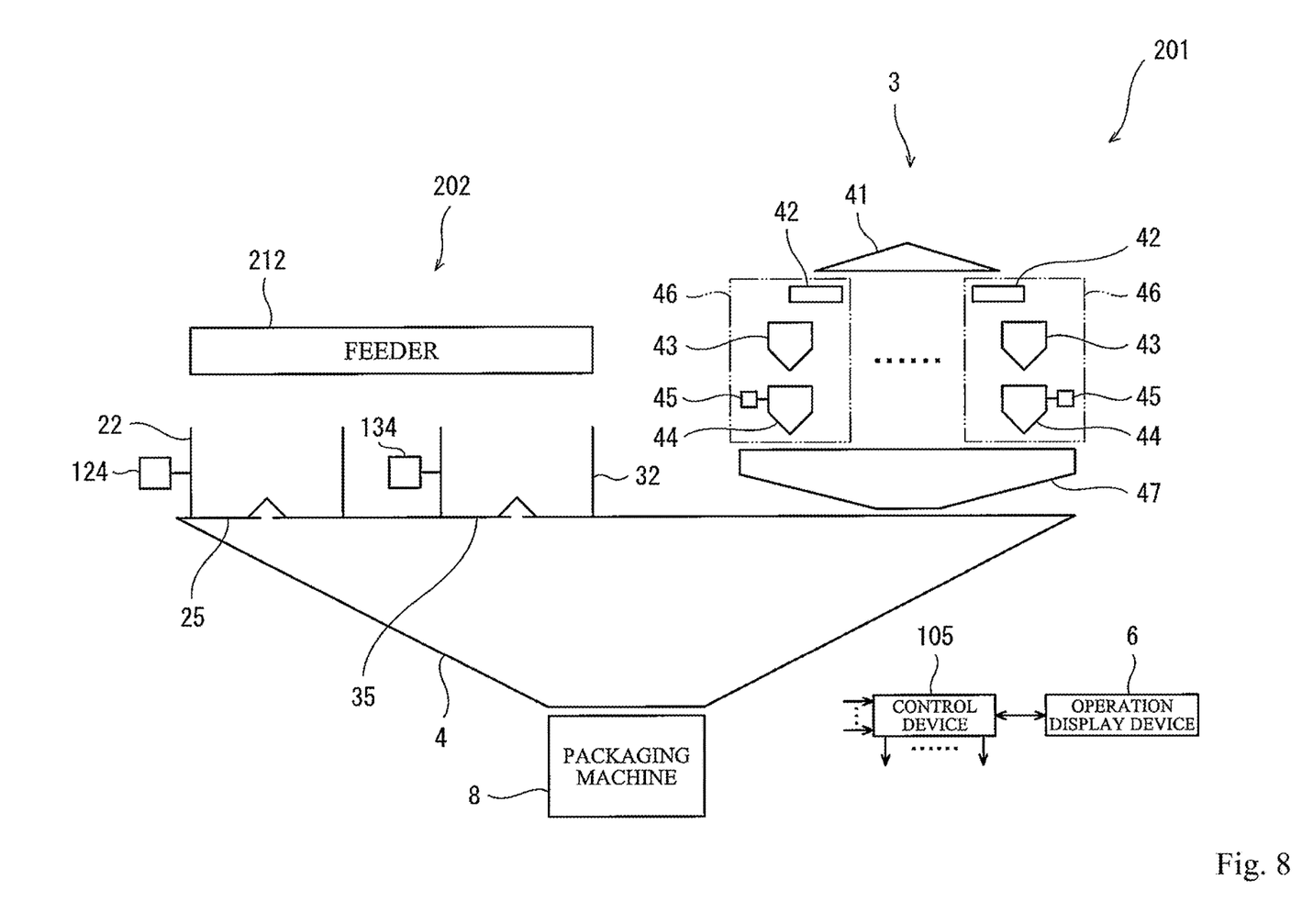
FIG. 8 is a schematic diagram of a weighing apparatus according to Embodiment 5.

FIG. 8 is a schematic diagram of a weighing apparatus 201 according to Embodiment 5. As shown in FIG. 8, in the weighing apparatus 201 of Embodiment 5, the upper hoppers are eliminated. Instead, a feeder 212 (feeding device) directly feeds the objects to be weighed to the first and second lower hoppers 22 and 32, and the objects thus fed are subjected to charge weighing. The objects to be weighed are charged from the feeder 212 into the lower hopper 22 at a constant flow rate stably, and at a point when the weight of the charged objects, the weight being measured by the weight sensor 124, has reached the target rough-charge weight, the feeder 212 is stopped from charging the objects to be weighed. The present embodiment pays attention to a phenomenon in which an impact load that is applied to the lower hopper 22 by the objects to be weighed that continuously fall from the feeder 212 into the lower hopper 22 is equivalent to the weight of the objects to be weighed that are present in the air at the point when the feeder 212 is stopped. Accordingly, in the present embodiment, the feeder 212 is stopped at the moment when the weight of the objects to be weighed, the weight being detected by the weight sensor 124, has reached the target rough-charge weight. According to this configuration, the apparatus can be made compact by eliminating the upper hoppers.

The present invention is not limited to the above-described embodiments, and modifications, additions, or deletions can be made to the configurations thereof. For example, in each of the above-described embodiments, in the combination weigher 3, each weighing unit is provided with one weighing hopper for use in the combination calculation. However, as an alternative, each weighing unit may be provided with a plurality of weighing hoppers for use in the combination calculation. The rough-charge weigher 2 is provided with two rough-charge weighing units as one example. Alternatively, the rough-charge weigher 2 may be provided with more than two rough-charge weighing units, or may be provided with only one rough-charge weighing unit. The cut gates 23 and 33 serve as one example of a feeding adjuster. Alternatively, a feeder configured to feed or stop feeding the objects by rotating or stopping rotating, such as a screw feeder, a rotary feeder, a disc feeder (table feeder), or an auger, may be used as the feeding adjuster.

REFERENCE CHARACTERS LIST

1, 1', 101, 201 weighing apparatus
2, 102, 202 rough-charge weigher
3 combination weigher
4 collecting chute
5, 105 control device (controller)
10, 10' first rough-charge weighing unit
11, 11' second rough-charge weighing unit
21 first upper hopper (feeding device)
22 first lower hopper
23 first cut gate (feeding adjuster)
24, 124 first weight sensor
31 second upper hopper (feeding device)
32 second lower hopper
33 second cut gate (feeding adjuster)
34, 134 second weight sensor
44 weighing hopper
212 feeder (feeding device)

The invention claimed is:

1. A weighing apparatus comprising:
a rough-charge weigher configured to weigh out objects to be weighed, such that the weighed objects have a predetermined rough-charge weight less than a target weight, and discharge the weighed objects;
a combination weigher including a plurality of weighing hoppers, each of which is configured to be fed with objects to be weighed, the combination weigher being configured to use a difference between the weight of the weighed objects that have been weighed out by the rough-charge weigher and the target weight as a target combination weight, weigh the fed objects to be weighed by the plurality of weighing hoppers, select a combination of weighing hoppers, from which to discharge the weighed objects, from among the plurality of weighing hoppers based on weights of the weighed objects that have been weighed by the plurality of weighing hoppers and the target combination weight, and discharge the weighed objects from the selected combination of weighing hoppers;
a collecting chute configured to collect the weighed objects discharged from the rough-charge weigher and the weighed objects discharged from the combination weigher, and discharge the collected weighed objects; and
a controller configured to control the rough-charge weigher and the combination weigher, wherein
the rough-charge weigher includes:
  a feeding device configured to discharge the objects to be weighed;
  a lower hopper configured to hold and discharge the objects to be weighed that are fed from the feeding device;
  a feeding adjuster configured to feed the objects to be weighed from the feeding device to the lower hopper, and adjust an amount of the objects to be weighed that are fed from the feeding device to the lower hopper; and
  a weight sensor provided on either the feeding device or the lower hopper, and
the controller:
  continuously measures, by the weight sensor, a weight of the objects to be weighed that are fed by the feeding adjuster from the feeding device to the lower hopper; and
  at a point when the weight of the objects to be weighed that are fed to the lower hopper has reached the rough-charge weight, stops the feeding adjuster from feeding the objects to be weighed.

2. The weighing apparatus according to claim 1, wherein the feeding device is an upper hopper configured to hold and discharge the objects to be weighed.

3. The weighing apparatus according to claim 1, wherein the rough-charge weigher includes a plurality of rough-charge weighing units, each of which includes the feeding device, the feeding adjuster, the lower hopper, and the weight sensor, and
the controller:
  causes weighing cycles of the plurality of respective rough-charge weighing units to overlap each other; and
  causes each of the plurality of rough-charge weighing units to discharge the weighed objects after weighing thereby has been completed, such that the plurality of rough-charge weighing units start discharging the weighed objects sequentially in an order of completion of the weighing thereby.

4. The weighing apparatus according to claim 1, wherein a first period of time extends from when feeding of the objects to be weighed from the feeding device to the lower hopper ends until when discharging of the weighed objects from the lower hopper starts, and the controller sets the first period to be shorter than either:
  a period of the feeding of the objects to be weighed from the feeding device to the lower hopper, or
  a period of the discharging of the weighed objects from the lower hopper.

5. The weighing apparatus according to claim 1, wherein the weight sensor is provided on the feeding device, and
a first period of time extends from when discharging of the weighed objects from the lower hopper ends until when feeding of the objects to be weighed from the feeding device to the lower hopper starts, and the controller sets the first period to be shorter than a period of the feeding of the objects to be weighed from the feeding device to the lower hopper.

6. The weighing apparatus according to claim 1, wherein the feeding adjuster includes a cut gate; and
the controller is configured to:

continuously measure, by the weight sensor, the weight of objects to be weighed that are fed from the feeding device to the lower hopper while the cut gate is open, start decreasing an opening degree of the cut gate when the measured weight has reached a weight in a predetermined proportion to the rough-charge weight, and close the cut gate at a point when a weight of the objects to be weighed that have been fed to the lower hopper.

* * * * *